(12) United States Patent
Hayes et al.

(10) Patent No.: US 8,602,084 B2
(45) Date of Patent: *Dec. 10, 2013

(54) FILTER CASTING NANOSCALE POROUS MATERIALS

(75) Inventors: Joel Ryan Hayes, Chandler, AZ (US); Gregory Walker Nyce, Pleasanton, CA (US); Jushua David Kuntz, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,695

(22) Filed: Jun. 14, 2012

(65) Prior Publication Data

US 2013/0037982 A1    Feb. 14, 2013

Related U.S. Application Data

(62) Division of application No. 11/594,522, filed on Nov. 7, 2006, now Pat. No. 8,226,861.

(60) Provisional application No. 60/817,039, filed on Jun. 27, 2006.

(51) Int. Cl.
*B22D 19/14*    (2006.01)

(52) U.S. Cl.
USPC .......................................................... 164/97

(58) Field of Classification Search
USPC .......................................................... 164/97
See application file for complete search history.

(56) References Cited

U.S. PATENT DOCUMENTS

| | | | |
|---|---|---|---|
| 5,312,580 A | 5/1994 | Erickson et al. | |
| 5,592,686 A | 1/1997 | Third et al. | |
| 5,848,351 A | 12/1998 | Hoshino et al. | |
| 6,210,612 B1 | 4/2001 | Pickrell et al. | |
| 6,410,160 B1 | 6/2002 | Landin et al. | |
| 6,502,623 B1 | 1/2003 | Schmitt | |
| 6,592,787 B2 | 7/2003 | Pickrell et al. | |
| 6,773,825 B2 | 8/2004 | Pickrell et al. | |
| 6,866,803 B1 | 3/2005 | Matsumoto et al. | |
| 8,226,861 B2 * | 7/2012 | Hayes et al. | 264/41 |
| 2003/0152759 A1 | 8/2003 | Chao et al. | |
| 2004/0118698 A1 | 6/2004 | Lu et al. | |
| 2005/0048193 A1 | 3/2005 | Li et al. | |
| 2005/0181253 A1 | 8/2005 | Finnerty et al. | |

* cited by examiner

*Primary Examiner* — Kevin P Kerns
(74) *Attorney, Agent, or Firm* — Eddie E. Scott

(57) ABSTRACT

A method of producing nanoporous material includes the steps of providing a liquid, providing nanoparticles, producing a slurry of the liquid and the nanoparticles, removing the liquid from the slurry, and producing monolith.

1 Claim, 4 Drawing Sheets

FILTER CASTING NANOSCALE POROUS MATERIALS

CROSS-REFERENCE TO RELATED APPLICATIONS

The present application is a divisional of U.S. application Ser. No. 11/594,522, filed Nov. 7, 2006, entitled "FILTER CASTING NANOSCALE POROUS MATERIALS", now U.S. Pat. No. 8,226,861, which is a non-provisional application of U.S. Provisional Application No. 60/817,039 filed Jun. 27, 2006, entitled "Nanoscale Porous Metals Through Slip Casting," now expired, the entire contents and disclosures of which are specifically incorporated by reference herein.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to porous materials and more particularly to nanoscale porous materials.

2. State of Technology

U.S. Pat. No. 5,592,686 for porous metal structures and processes for their production, issued Jan. 7, 1997 to Christine Third et al, provides the following state of technology information: "At the present time powder metallurgy techniques are utilized for the fabrication of engineered porous metal structures. Typically, such porous metal components are designed having particular properties and for specific applications. The utility of the components extends to battery materials, friction parts, electronic and electrical components, and the like. However, with expanding markets, applications for specialty porous metal products are constantly increasing and diversifying."

U.S. Pat. No. 5,848,351 for porous metallic material having high specific surface area, method of producing the same, porous metallic plate material and electrode for alkaline secondary battery, issued Dec. 8, 1998 to Kouji Hoshino et al, provides the following state of technology information: "Porous metallic materials having a three-dimensional network skeleton in which pores are formed are conventionally used as structural members of various machines and apparatus. For example, such metallic materials are used as an active substance holding material of an electrode of an alkaline secondary battery, a hydrolytic electrode, a kerosene atomizing member of a petroleum heater, a magnetic shield packing, a gas expansion buffer of an air cushion using an explosive, a sound absorbing material, various filters such as a hydrolytic filter of a clarifier, an electrostatic filter of an air clarifier, an oil mist filter for an engine exhaust gas, a filter of a high-temperature exhaust dust collector, etc."

U.S. Pat. No. 6,592,787 for porous articles and method for the manufacture thereof, issued Jul. 15, 2003 to Gary Pickrell et al, provides the following state of technology information: "In the production of certain articles for use in many applications, such as refractory, kiln furniture, filtration, fuel cell, bone implant, catalyst substrates, catalysts, particular traps, filters, diffusion layers, electrical conductors, heat exchange components, wicks for heat pipes, wicks for burners, radiant burner surfaces, diffusion layers for introducing fuel and/or water into an air stream. It is sometimes desirable to reduce the overall density of the fabricated article by introducing porosity into the article during or after fabrication. The strategy employed for reducing the mass of the article after fabrication usually involves removal of material from the article by means of grinding, drilling, routing or other mechanical methods to physically remove material from selected locations. This usually takes the form of drilling holes, routing channels, etc. Reducing the mass of the material (per unit volume of space occupied by the fabricated article) during fabrication involves using a process which introduces porosity into the material."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method and system for producing nanoporous material. For example the present invention provides a method and system for producing nanoporous, monolithic metals, metal alloys, metal oxides, metal/polymer, and metal/metal oxide composites, or any combination of the materials.

The present invention provides a method of producing nanoporous material. The method includes the steps of providing a liquid, providing nanoparticles, producing a slurry of the liquid and the nanoparticles, removing the liquid from the slurry, and producing a monolith. The step of providing nanoparticles can be providing metal or metal alloys or providing metal oxides or providing metal polymer combinations or providing metal oxide composites, or providing combinations of the metal oxides, metal polymer combinations, and metal oxide composites. In one embodiment, the step of providing nanoparticles includes providing a metal alloy and dealloying the metal alloy. One embodiment includes the steps of providing a sacrificial material together with the nanoparticles and removing the sacrificial material. One embodiment includes the steps of providing a polymer together with the nanoparticles and removing the polymer.

In one embodiment, the step of removing the liquid from the slurry includes providing a mold of liquid absorbing material and positioning the slurry in the mold. In one embodiment, the step of removing the liquid from the slurry includes providing a plaster of paris mold and positioning the slurry in the mold. In one embodiment the method of producing nanoporous material includes the step of annealing the monolith.

The present invention has many uses. The invention has use in any situation that uses a porous nanoporous material. For example, the present invention can be used producing nanoporous materials that have use for the National Ignition Facility (NIF) double shell targets and hohlraums. The present invention can also be used producing nanoporous materials that have use for current high energy density experiments being performed on the OMEGA laser. The present invention can also be used producing nanoporous materials that have use for Surface Enhanced Raman Spectroscopy substrates.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
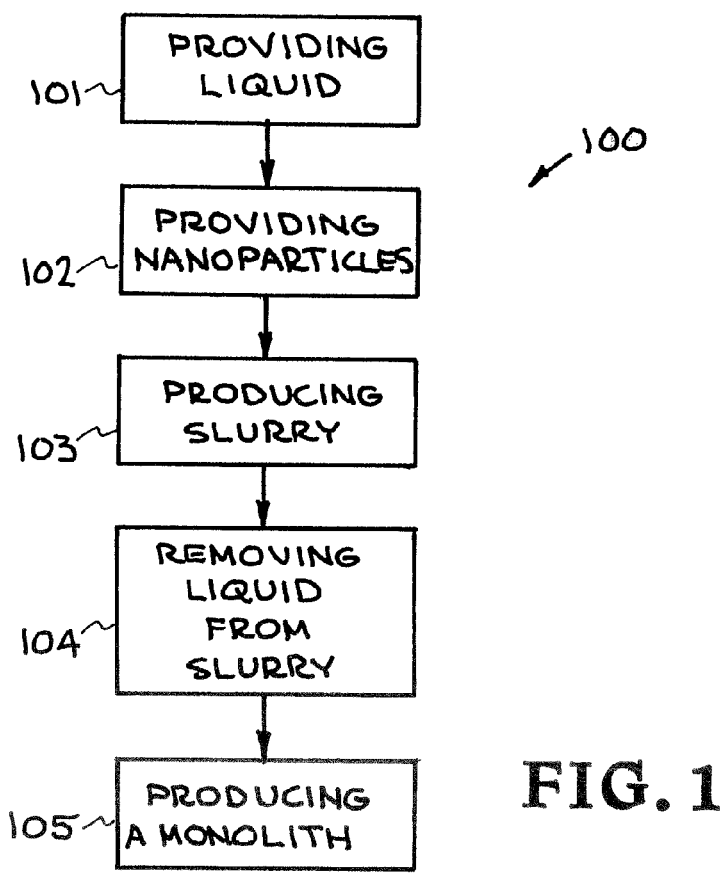
FIG. 1 illustrates one embodiment of a method of producing nanoporous material in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, one embodiment of a method of producing nanoporous material in accordance with the present invention is illustrated. The method is designated generally by the reference numeral 100. The method 100 includes the steps of providing a liquid 101, providing nanoparticles 102, producing a slurry of the liquid and the nanoparticles 103, removing the liquid from the slurry 104, and producing a monolith 105.

The step of providing nanoparticles 102 can be providing metal or metal alloys or metal oxides or metal polymer combinations or metal oxide composites, or combinations of the metal oxides, metal polymer combinations, and metal oxide composites. In one embodiment the step of providing nanoparticles 102 is providing metal nanoparticles. In another embodiment the step of providing nanoparticles 102 includes the steps of providing a metal alloy and dealloying the metal alloy. In another embodiment the step of providing nanoparticles 102 includes the steps of providing a metal polymer combination and removing the polymer from the metal polymer combination.

The step of removing the liquid from the slurry 104 in one embodiment includes the steps of providing a plaster of paris mold and positioning the slurry in the mold. The plaster of paris is not restrictive, but can be replaced by any solvent absorbing material with pores fine enough to filter the nanoparticles onto the surface. The step of producing a monolith 105 in one embodiment includes the step of annealing the monolith.

Figure 2:
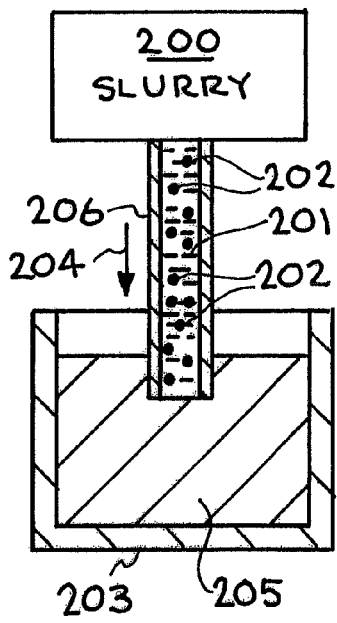
FIGS. 2, 3, and 4 illustrate additional embodiments of methods of producing nanoporous material in accordance with the present invention
Figure 3:
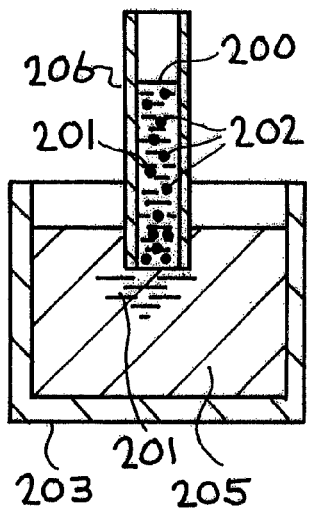
Figure 4:
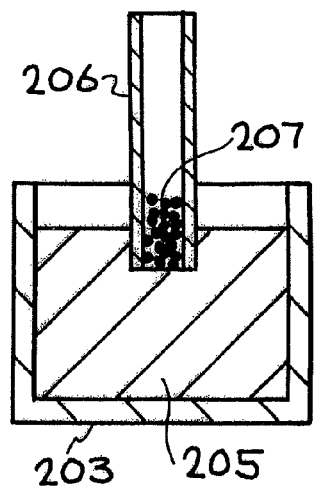

Referring now to FIGS. 2, 3, and 4; additional embodiments of methods of producing nanoporous material in accordance with the present invention are illustrated. As shown in FIG. 2, a slurry 200 is formed of water 201 and nanoparticles 202.

As illustrated in FIG. 2, the slurry 200 is formed by mixing the water 201 and the nanoparticles 202 of interest. In one embodiment the water 201 and the nanoparticles 202 are mixed using a 30:1 water 201 to nanoparticles 202 ratio by volume. Other ratios can be used within the range of 30:1 to 300:1. An ultrasonic probe is used to aid the dispersion of the nanoparticles 202 in the slurry 200. A surfactant may or may not be added to maintain the nanoparticles 202 suspension.

The slurry 200 is added to a mold 203 as illustrated by the arrow 204. The mold 203 is a plaster of paris base 205, typically 1" thick, with a tube 206, typically either TEFLON non-stick coating or PVC, inserted /1;8" to ½" deep. The amount of plaster of paris base 205 is proportional to the amount of water 201 to be removed from the slurry 200. The tube 206 diameter depends on bow large the monolith needs to be.

The casting itself can be as simply as placing the slurry 200 into the tube 206 such that no bubbles form to impede the casting process. The mold 203 is pre-heated in an oven and subsequently removed from the oven and allowed to cool. A small amount of water is added to pre-wet the plaster at the bottom of the tube 206. The slurry 200 is then added to the tube 206 and the plaster absorbs the water 201 from the slurry 200, while simultaneously filtering the particles 202 onto the surface of the plaster. As the particles interact with each other they stick together and form a uniform monolith with a density of about 30%.

As illustrated in FIG. 2, the water 201 is removed from the slurry 200. The plaster of paris mold base 205 is used to remove the water 201 from the slurry 200 while simultaneously filtering out the particles 202 to produce a monolith. The plaster of paris mold base 205 in the mold 203 is allowed to set, and then placed in an oven at 50.degree. C. to bake out all residual water 201.

If necessary, additional water can be removed. As illustrated in FIG. 3, after all of the water 201 has been removed, the mold 203 and monolith 207 are placed back into the oven at 50.degree. C. for .about.8 hours to remove all of the water 201. The monolith 207 can then be removed from the tube 206. During this process, the nanoparticles 202 contact each other and form a monolith 207 with interconnecting pores that are on the scale of the nanoparticles size. As-cast densities are on the order of 30% of bulk density for the metal.

Multiple metals can be slip cast together, or a mix of metal particles and polymer particles, or a mix of metal particles and metal oxide particles, or pure metal oxides. An as-slip-cast monolith 207 is typically 0.5-10 mm thick and in the shape of the mold 203. The monolith 207 can be robust or fragile, and post casting processing, such as annealing, can serve to strengthen the monolith through sintering of the particles, without increasing the density. Densities can be decreased by removing the polymer from a metal/polymer blend through etching, or through dealloying a metal alloy or mixed metal system. Alternative sacrificial particles can be used in place of a polymer to decrease the density, such as $SiO_2$, which is added to the slurry, and subsequently removed from the cast monolith through a hydrofluoric acid etch. Any particle which is non-soluble in the slurry solvent, yet can be removed from the cast monolith by a different solvent or other processing step such as a thermal anneal may be used.

EXAMPLES

The present invention provides a method of creating nanoporous, monolithic metals, metal alloys, metal oxides, metal/polymer, and metal/metal oxide composites, or any combination thereof. The method includes the steps of providing a liquid, providing nanoparticles, producing a slurry of the liquid and the nanoparticles, removing the liquid from the slurry, and producing a monolith. The steps of producing a slurry of liquid/nanoparticles removing the liquid from the slurry can include different steps in the different embodiments of the present invention. For example, slip casting can be used with nanoparticles in suspension. Either single component solutions, or mixed metals, metal oxides, organic particles, etc. can be used. Filter casting can be used.

Various examples of the present invention will be described. Densities can be decreased by removing the polymer from a metal/polymer blend through etching, or through dealloying a metal alloy or mixed metal system. Multiple metals can be slip cast together, or a mix of metal particles and polymer particles, or a mix of metal particles and metal oxide particles, or pure metal oxides. The monolith can be robust or fragile, and post casting processing, such as annealing, can serve to strengthen the monolith through sintering of the particles, without increasing the density.

Pure Metal Example

A slurry is formed of water and nanoparticles of pure metal. The water is removed from the slurry. A pure metal monolith is produced. The pure metal monolith can be used as is, or can be slightly sintered at a low temperature (~200-600.degree. C.) to increase the robustness of the structure. The temperature must be chosen such that sintering occurs to strengthen structure, but no densification occurs.

Mixed Metals Example

Figure 5:
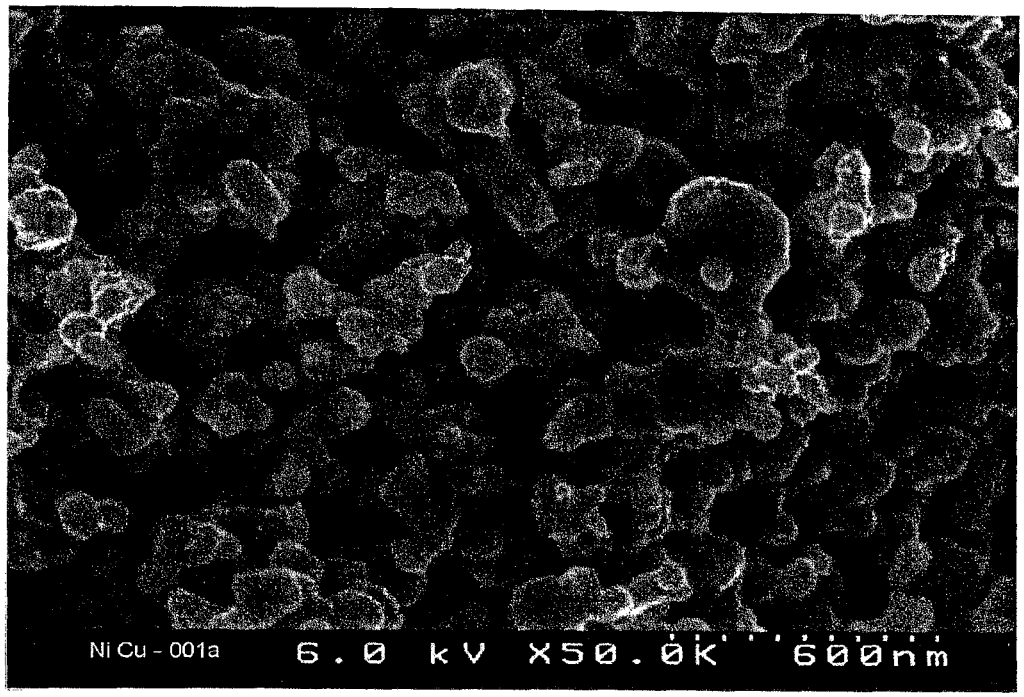
FIG. 5 shows a (Ni,Cu): Ni,Cu bimetallic filter cast structure.

A slurry is formed of water and nanoparticles of mixed metals. The water is removed from the slurry. A mixed metal monolith is produced. If alloying occurs, and the proper combination of metals is used, such as Ag/Au, the structure can then be dealloyed to further decrease the density of the monolith and increase the surface area. The mixed metal monolith can be slightly sintered at a low temperature (~200-600.degree. C.) to increase the robustness of the structure and to alloy the metals if that is desired. An example of a mixed metal structure is shown in FIG. 5. FIG. 5 shows a (Ni,Cu): Ni,Cu bimetallic filter cast structure. This illustrates nickel copper (Ni,Cu) being a filter casting of a mixture of copper and nickel nanoparticles.

Dealloying Example

Figure 6:
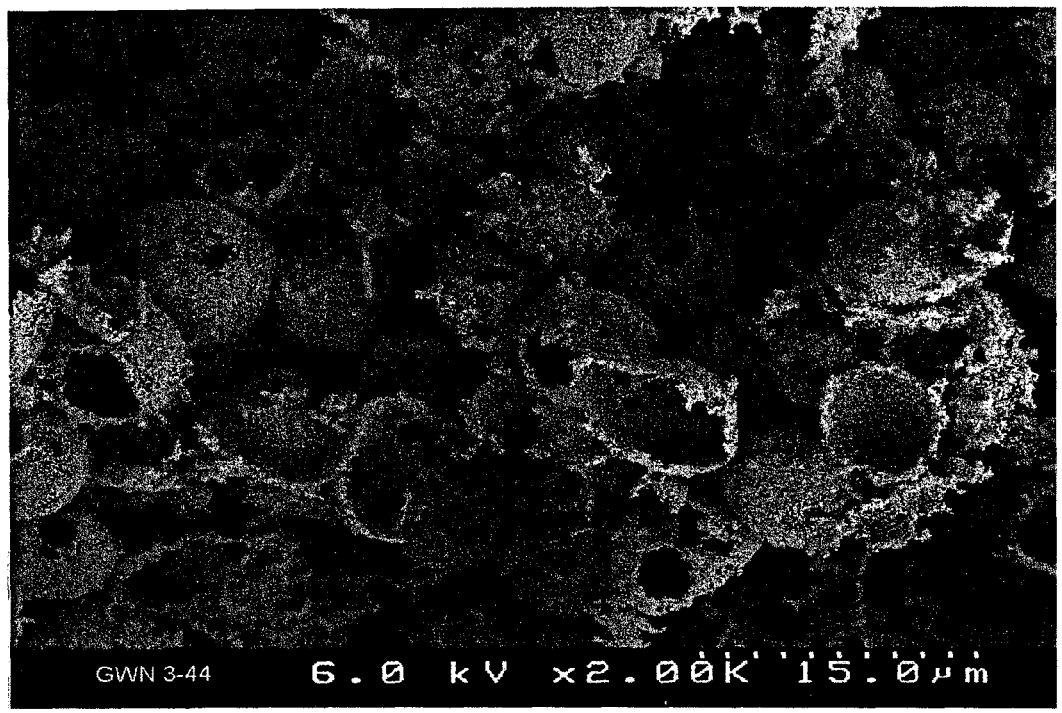
FIG. 6 shows a filter cast structure of hollow Ag/Au spheres that were subsequently dealloyed in nitric acid.
Figure 7A:
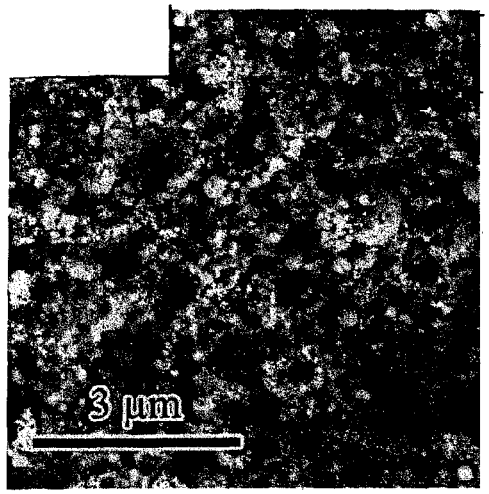
FIGS. 7A, 7B, 7C, and 7D show (A) CuO, (B) reduced to Cu at 250° C. in 4% $H_2$, (C) $Cu_2O$, and (D) reduced to Cu at 400° C. in 4% $H_2$.
Figure 7B:
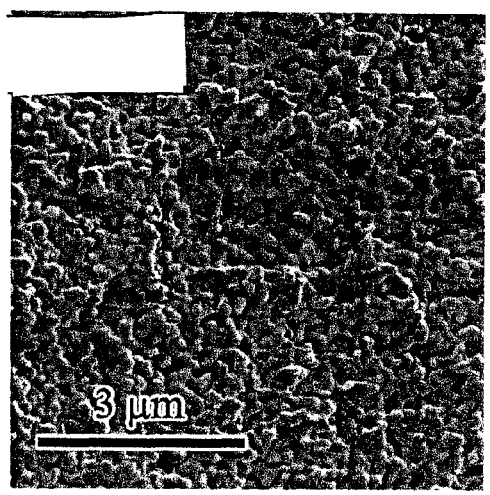
Figure 7C:
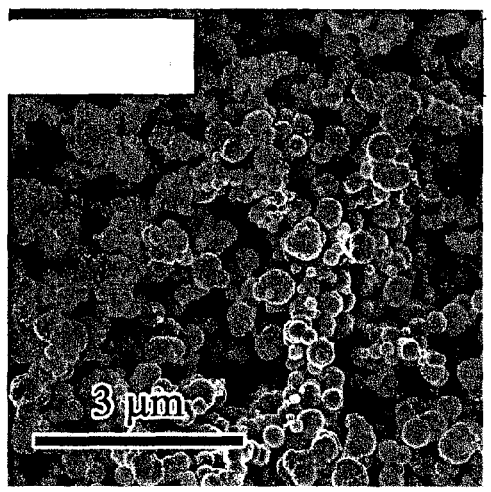
Figure 7D:
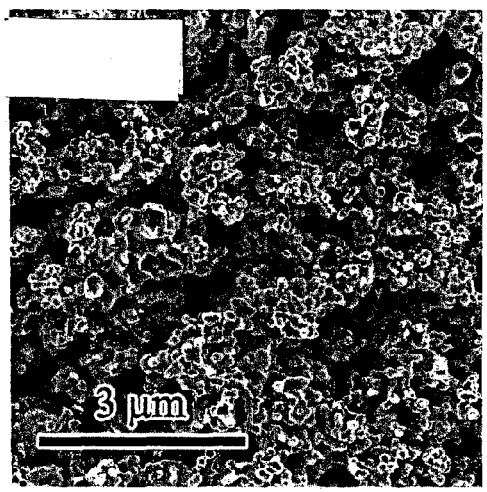
Figure 8A:
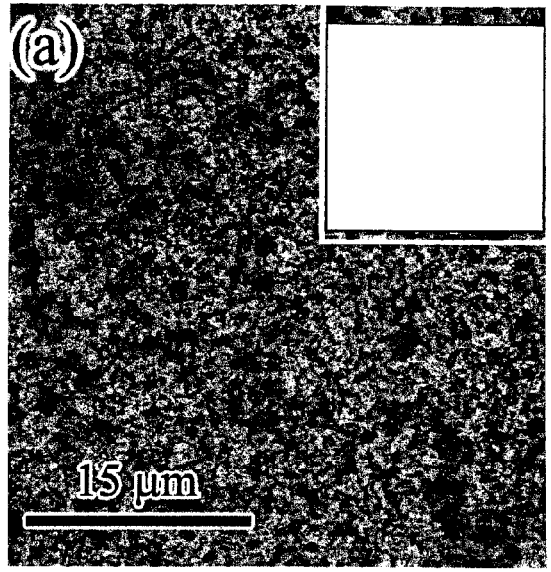
FIGS. 8A, 8B, 8C, and 8D show porous Cu structures with bi-modal pore sizes created with sacrificial polystyrene (PS) spheres.
Figure 8B:
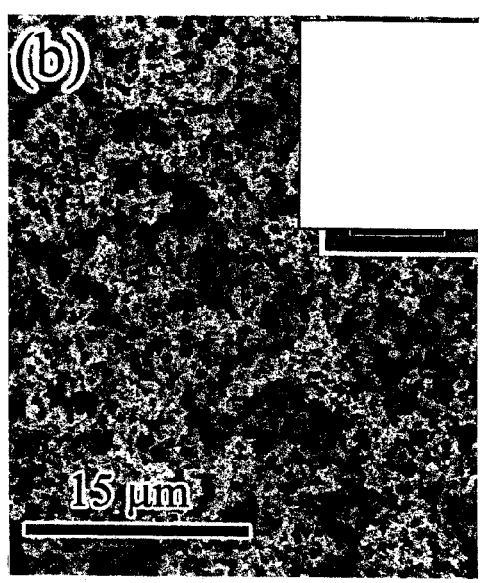
Figure 8C:
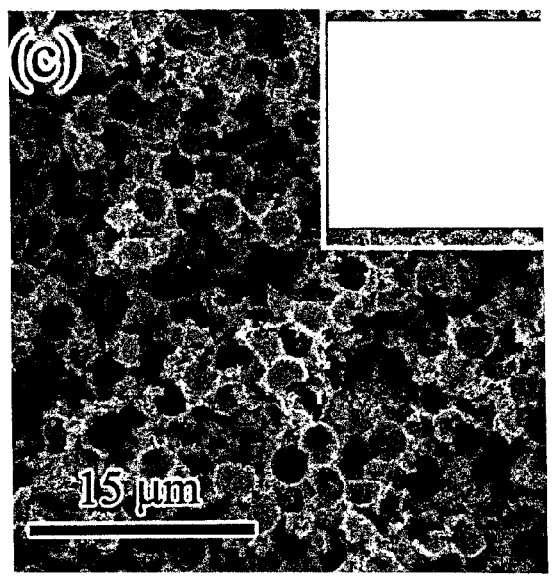
Figure 8D:
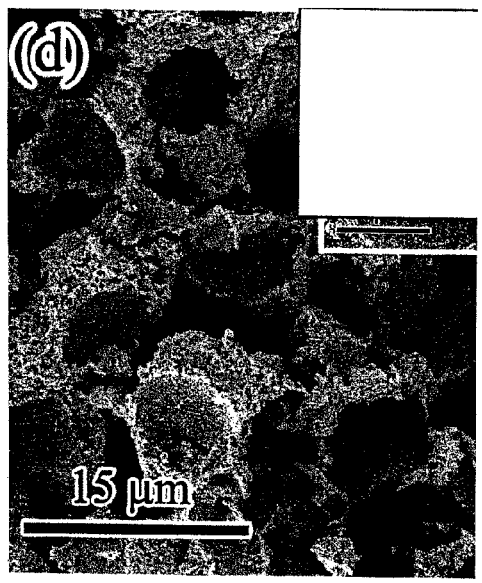

Dealloying is a corrosion process of a bulk alloy that selectively removes one component of the alloy. Dealloying can occur either chemically or electrochemically. For example, in a silver-gold alloy, the silver can be selectively removed by placing the alloy in nitric acid. The nitric acid slowly dissolves the silver component while leaving the gold component behind to form a gold foam. Driving the dealloying process electrochemically also allows one to tailor the microstructure of the metal foam by changing the parameters of the electrochemical experiment. An example of this structure is shown in FIG. 6 (dealloyed), representing hollow Ag/Au spheres that were filter cast and then dealloyed in nitric acid to create a highly porous structure. FIG. 6 (dealloyed) shows a filter cast structure of hollow Ag/Au spheres that were subsequently dealloyed in nitric acid.

Metal/Polymer Example

An as cast metal polymer system is used as is, or the polymer is removed by etching in a suitable chemical, or by burning the polymer out. In this manner a lower density monolith is formed, or a monolith with bimodal pore structures.

Metal Oxides Example

A metal oxide is slip cast, and the monolith is used as is, or the oxide is reduced in a suitable environment, such as hydrogen, to yield a pure metal. This step serves to strengthen the structure. Examples of structures obtained with the method are shown in FIGS. 7A, 7B, 7C, and 7D. As illustrated in FIGS. 7A, 7B, 7C, and 7D (oxides): Monoliths were created from (A) CuO shown in FIGS. 7A and (B) reduced to Cu at 250.degree. C. in 4% H.sub.2 shown in FIG. 7B, and from (C) CU.sub.2O shown in FIGS. 7C, and (D) reduced to Cu at 400.degree. C. in 4% H.sub.2 shown in FIG. 7D.

Bimodal Nanoporous Cu Monoliths Example

Nanoporous Cu with a relative density of 35% and a pore size of 50-100 nm was created by filter-casting plain Cu nanoparticles. The resulting pore structure is derived from the interstitial space between randomly agglomerated particles. After casting, the sample was annealed at 400.degree. C. under 96/4% Ar/H.sub.2 which lightly sintered the structure and reduced much of the surface oxide. The pore structure and final density was modified by adding polystyrene (PS) spheres of various diameters to the Cu-water suspension.

For example, a 1:5:175 Cu/polystyrene/water by volume solution was mixed and ultrasonicated to ensure homogenization, and then filter-cast. Polystyrene spheres of 1.0, 3.2, and 9.6 microns were used. The resulting structure is of polystyrene uniformly dispersed in a network of nanoporous copper. The samples were subsequently annealed at 400.degree. C. in 96/4% Ar/H.sub.2 to remove the polystyrene template, reduce the oxide on the surface of the Cu, and slightly sinter the Cu particles. This resulted in structures with bi-modal porosity and densities on the order of 15%. The amount of polystyrene added can be varied to influence the degree to which the subsequent voids are interconnected.

Examples of these structures are shown in FIGS. 8A, 8B, 8C, and 8D. FIGS. 8A, 8B, 8C, and 8D show porous Cu structures with bi-modal pore sizes created with sacrificial polystyrene (PS) spheres. The structures were created with Cu nanoparticles shown in FIG. 8A, Cu nanoparticles plus 1 .mu.m PS shown in FIG. 8B, Cu nanoparticles plus 3.2 .mu.m PS shown in FIG. 8C, and Cu nanoparticles plus 9.6 .mu.m PS shown in FIG. 8D. After filter casting, the structures were annealed in 96/4% Ar/H.sub.2 to remove the polystyrene.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of producing nanoporous material consisting of the steps of:
   providing a liquid;
   providing metal nanoparticles;
   providing a sacrificial material, said step of providing a sacrificial material including providing a sacrificial polymer;
   producing a slurry of said liquid, said metal nanoparticles, and said sacrificial material including said sacrificial polymer;
   removing said liquid from said slurry;
   producing a monolith; and
   removing said sacrificial material from said monolith, said step of removing said sacrificial material from said monolith including removing said sacrificial polymer from said monolith.

* * * * *